June 2, 1936.   C. W. FRY ET AL   2,042,594
SEEPPROOF BAG
Filed Feb. 27, 1935
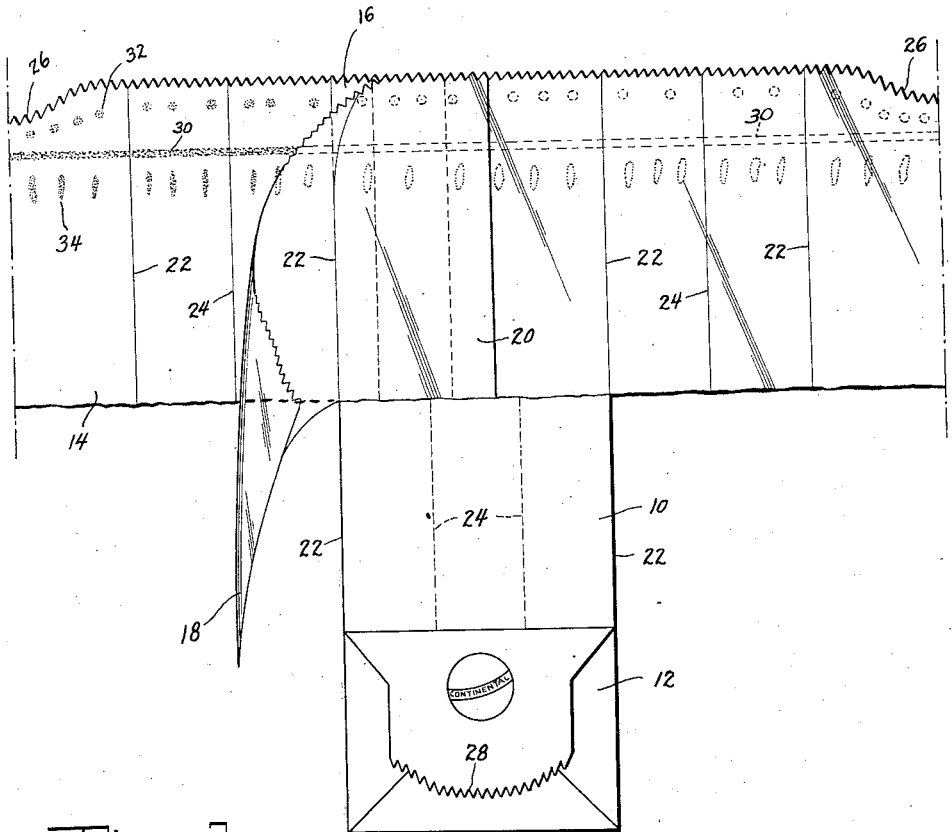
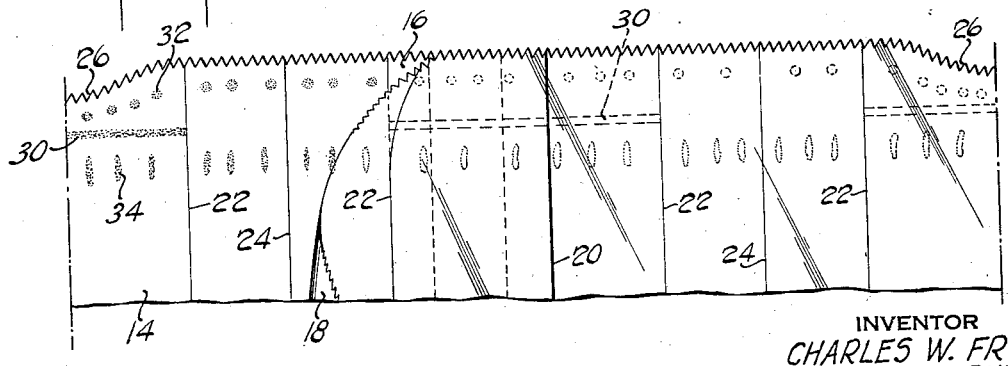
INVENTOR
CHARLES W. FRY
BY HERBERT L. RUFF
ATTORNEY Patented June 2, 1936

2,042,594

UNITED STATES PATENT OFFICE 2,042,594

SEEPPROOF BAG

Charles W. Fry, East Orange, and Herbert L. Ruff, Roselle Park, N. J., assignors to Continental Paper & Bag Corporation, New York, N. Y., a corporation of Delaware Application February 27, 1935, Serial No. 8,432

7 Claims. (Cl. 229—55)

Our invention relates to a lined or multi-wall bag, primarily intended for the packaging of coffee, although not limited to such use. The standard coffee bag, recognized as such in the trade, is an automatic, or self-opening bag having an outer ply of relatively heavy paper, coated to present a white background, or uncoated to present a natural background, upon which a design is printed in colors, or coated over its entire surface with a coating, ink, or paint, of one color upon which is printed a design in other colors. The inner ply of the bag consists of some light paper or other material, which may be treated in such a fashion as to be more or less waterproof, airtight, and unaffected by the oils and other constituents of the coffee, or other product. This inner ply is usually made of glassine, regenerated cellulose, or some type of paper, such as waxed paper.

A good coffee bag must be substantially greaseproof and have a high bursting strength. Other requirements in the order of their importance are that it be airproof and moistureproof. One of the objects of this invention is to preserve to the fullest advantage the foregoing qualities in a bag which has been filled, regardless of the carelessness with which the filling is accomplished. It is readily apparent that careless handling of an ordinary bag will result in the insertion of grains of coffee between the plies of the bag in such a manner as to prevent the formation of a perfect seal and also to discolor the bag, as will presently appear.

A good coffee bag likewise must be pleasing in appearance after it has been filled and placed before the public. No one will purchase coffee in a bag which has been discolored. It is generally known throughout the trade that coffee, particularly while it is still warm from the roasting process or when stored in a heated room, and particularly in moist atmosphere, exudes an oil or oils. A grain of coffee placed next to an absorbent sheet of paper will, in a very short space of time, deposit sufficient oil upon the paper to leave a brown, disfiguring ring or spot which may be as large as a quarter of an inch in diameter. If such discolorations were allowed to appear upon the outer surface of a coffee bag standing upon a grocer's shelf a discriminating purchaser, not only would not purchase that particular bag, but would refrain from purchasing any coffee because of the natural belief that the entire lot had been standing upon the shelves for a great length of time. With the present demand for freshly roasted coffee it is imperative that a package have the appearance of having been but recently packed, and the misconstruction placed upon the appearance of oil spots quite often leads to the rejection of a large quantity of freshly roasted coffee. It is the primary object of our invention to devise a bag which will substantially, if not entirely, be free from spots regardless of the carelessness with which the bag may be filled.

It is of course within the purview of our invention that the same advantages and objects will be achieved in the packing of tea, which affects paper in the same manner but to a much less extent, or other products which may affect the paper to a much greater extent than would coffee, and particularly chemicals which attack the inks or other coating.

The scope of our invention will be more fully realized from the following description taken in connection with the accompanying drawing wherein like numerals refer to like parts.

Referring to the drawing:

Fig. 1 shows the preferred form of our invention, and

Fig. 2 illustrates a modified form.

Fig. 1 illustrates a standard, automatic bag having a tubular body 10 and bottom 12 folded back upon the body in the manner in which the bags are sold before being opened and filled. The bag comprises an outer ply 14 of absorbent paper, or any material sufficiently absorbent or of such a nature that it may be discolored by the contents of the bag. The outer ply is overlapped, preferably adjacent one edge of the bag as at 16, the position of the overlap being determined by the particular process or machine used, or whim of the manufacturer or purchaser. The inner ply of the bag consists of a non-absorbent ply 18, usually of thin, semi-transparent material, such as glassine, which resists the ingress of moisture and air and prevents the escape of the coffee aroma and oils, and reinforces the strength of the outer wall or walls. The inner ply is overlapped as at 20. In the manufacture of multiply bags it is standard practice to superimpose the inner ply as a continuous web led from a roll and the outer ply or plies as a continuous web or webs led from a roll, and to lead the combined webs through a tuber wherein the overlapping edges of each ply are adhered to form a continuous multi-ply tube. In the tuber, the tube is provided with tucks at the sides and creased at 22 and 24 so as to form gusseted bags. The drawing illustrates a single bag, formed from a length severed from the continuous tube, having a bottom formed in the bottomer by usual mechanism.

A feature of the standard coffee bag is that one edge of the mouth is provided with a notch 26 by means of which the bag may be easily opened. In the drawing, the upper end of the bag has been cut open and laid flat so that half of the notch 26 appears at each end of the developed blank. Due to the fact that bag length is struck from the continuous tube the counterpart of the notch 26, comprising a rounded portion 28, appears at the opposite ends of the bag as a part of the bottom.

It is the usual practice to secure the walls together at the bottom folds and also by several spaced spots of adhesive between the walls at the top of the bag. With such a bag it is impossible to prevent grains of coffee from dropping between the two plies and seeping down between the spots of paste where the walls are not secured together. A single grain lodged between the plies will often discolor the design in a short space of time, due to its oils soaking through the absorbent outer ply, to such an extent as to destroy the salability of the package. It has been proposed to unite the inner ply to the outer ply by a continuous band of adhesive extending to the edges of the bag, as by applying a broad band of adhesive within the zone of which the edge of the bag is struck from the tube. This is practical, as far as achieving the result of preventing grains of coffee from dropping between the plies, but it is undesirable inasmuch as the adhesive quite often partially or completely closes the mouth of the bag before it has been filled, particularly since the notch 26 allows adhesive to flow from between the plies onto the inner surfaces of the opposite wall and of the gussets against which the notch lies. The extrusion of the adhesive is not only probable but is practically certain inasmuch as the bags are pressed and passed between rolls of various sorts after the adhesive has been applied thereto and after the bag length has been struck from the continuous web. A second harmful effect is that one bag is often adhered to the adjacent bags as they are stacked upon ejection from the machine, thereby marring the design or tearing the lips of the bag.

It has also been proposed to unite the two plies by a band of adhesive closely following the contour of the edge of the bag mouth. This will effectively unite the two plies to prevent the dropping of material therebetween but has the same harmful effects, particularly at the fold lines 22 and 24 inasmuch as considerable pressure is necessary to insure permanent creases at the fold lines. A second disadvantage is that more adhesive is necessary than with the present invention.

We have overcome the difficulties and achieved the desired results by the invention illustrated, without altering the appearance of the standard coffee bag and without increasing the amount of adhesive used. Our invention comprises a narrow, continuous band of adhesive 30 placed upon the inner ply and adhering it to the adjacent ply, the said band being spaced from the lowermost point of the notch 26 to such an extent that adhesive cannot be extruded beyond the edge of the bag. This is particularly true at the fold lines where the greatest pressure occurs inasmuch as the edge of the bag is a great deal further from the straight line of adhesive at the fold lines than it is at the notch. It is also practical to use a band of paste substantially following the contour of the top edge of the bag but spaced a uniform distance below the edge.

The line of adhesive 30 is in the area which will be folded into a seal for the filled bag, and since it completely encircles the bag any grains of material coming between the edges of the plies will be prevented from dropping to the area which is disclosed to the purchaser.

In order that there will be little likelihood of any material at all being interposed between the plies I supplement the straight line of adhesive by a line of very small spots of adhesive 32 following the contour of the bag edge closely adjacent thereto. The spots may be regularly or irregularly placed but each spot is of such a small area that the entire spot will be absorbed before some of the paste is extruded. A paramount consideration in the placing of the spots in that none of them shall be upon or closely adjacent to the fold lines 22 and 24 which are subjected to the greatest pressure. It is highly improbable and almost impossible for any grains of material to be lodged above the line of adhesive 30, whereby it is made certain that an efficient closure of the bag can be obtained.

It quite often happens that the mouth of a bag is roughly handled during the filling operation and the plies can be torn apart by such handling. In order effectively to protect the line of adhesive 30 from any strains we may supplement it by spots of adhesive 34 positioned below the line. These spots are preferably elongated in the direction of the body of the bag so as to provide a greater area of distribution thereof, without there being applied so much adhesive that it could be extruded beyond the mouth of the bag.

Either of the lines of spots 32 or 34 could be omitted within the scope of our invention since either is but an adjunct to the primary features of the invention which comprises a narrow band of adhesive parallel to the general edge of the bag and spaced therefrom sufficiently to prevent extrusion of the paste. Similarly, if the line 30 and the spots 32 are used in combination, the spots 34 may be omitted since they are but strengthening means to maintain the primary adhering portions.

Fig. 2 illustrates a modified form of our invention wherein the line 30 is extended across the front and back of the bag but is omitted at the gussets. This form of the invention is desirable in the manufacture of duplex bags of which the outer ply 14 is of very thin, porous material. We have found that in the manufacture of such bags a double line of paste at the gusset folds 22 is undesirable since the squeeze rolls, which form the gusset folds, tend to force the paste, or glue, through the material thereby discoloring the outer surface of the bag. The primary purpose of our invention is nevertheless achieved in this form inasmuch as the gussets tend to hold the plies together, and it is extremely unlikely that material would drop between the plies at the gussets. The bar 30 is in position at the wide front and back sides to stop any material tending to drop between the plies at those places where the plies most often separate. As in the other form, the spots 32 and spots 34 may be used in any desired combination with the bar 30.

It will be appreciated that the scope of our invention is not limited to a gussetted or automatic bag inasmuch as the invention comprises the relationship of paste bars inserted between the innermost and adjacent plies of a bag for the purposes set forth. To fully illustrate the ultimate details, Fig. 1 comprises the representation of a gusseted bag. However, the invention therein is as pertinent to a flat or square bag, or any type of bag lacking gussets, and regardless of the mode of bottoming the tubular blank. The reason for selecting a gusseted bag of the type illustrated is that this is the standard coffee or tea bag. Other industries have, for one reason or another, chosen to use flat or square bags, etc. and the same features may be incorporated in such bags.

Although we have illustrated but two forms of bag and have illustrated the preferred arrangement of a paste bar and spots it will be appreciated that modifications thereof are possible and we do not intend to be limited to the exact details disclosed except insofar as determined by the scope of the following claims.

We claim:

1. A bag for use in the packaging of coffee and other materials comprising, a tubular member longitudinally folded so as to provide gussets, said member being composed of an outer ply of absorbent paper and an inner ply of non-absorbent material, the edge of the bag mouth being inwardly notched below the end of the bag at at least one point, and a line of adhesive placed between the plies adjacent the mouth of the bag and joining the plies together, said line of adhesive being spaced inwardly of the mouth of the bag and below the innermost reach of said notch.

2. A bag for use in the packaging of coffee and other materials comprising, a tubular member longitudinally folded so as to provide gussets, said member being composed of an outer ply of absorbent paper and an inner ply of non-absorbent material, the edge of the bag mouth being inwardly notched below the end of the bag at at least one point, a line of adhesive placed between the plies adjacent the mouth of the bag and joining the plies together, said line of adhesive being spaced inwardly of the mouth of the bag and below the innermost reach of said notch, and a plurality of spaced spots of adhesive between the plies interposed between said line of adhesive and the edge of the bag mouth.

3. A bag for use in the packaging of coffee and other materials comprising, a tubular member longitudinally folded so as to provide gussets, said member being composed of an outer ply of absorbent paper and an inner ply of non-absorbent material, the edge of the bag mouth being inwardly notched below the end of the bag at at least one point, a line of adhesive placed between the plies adjacent the mouth of the bag and joining the plies together, said line of adhesive being spaced inwardly of the mouth of the bag and below the innermost reach of said notch, and a plurality of spaced spots of adhesive between the plies interposed between said line of adhesive and the edge of the bag, said spots being spaced from the fold lines of the gussets.

4. A bag for use in the packaging of coffee and other materials comprising, an outer ply of absorbent paper, and an inner ply of non-absorbent paper, a line of adhesive therebetween adjacent to and parallel to the mouth of the bag, said line of adhesive being spaced from the edge of the bag mouth, a plurality of spaced spots of adhesive between the plies interposed between said line of adhesive and the edge of the bag, and a plurality of other spots of adhesive between the plies positioned along the opposite side of said line of adhesive.

5. A bag for use in the packaging of coffee and other materials comprising, an outer ply of absorbent paper and an inner ply of non-absorbent material, the edge of the bag mouth being inwardly notched below the end of the bag at at least one point, a line of adhesive placed between the plies adjacent the mouth of the bag and joining the plies together, said line of adhesive being spaced inwardly of the mouth of the bag below the innermost reach of said notch, a plurality of spaced spots of adhesive between the plies interposed between said line of adhesive and the edge of the bag, and a plurality of other spots of adhesive between the plies positioned along the opposite side of said line of adhesive.

6. A bag for use in the packaging of coffee and other materials comprising, a tubular member longitudinally folded so as to provide gussets, said member being composed of an outer ply of absorbent paper and an inner ply of non-absorbent material, the edge of the bag mouth being inwardly notched below the end of the bag at at least one point, a line of adhesive placed between the plies adjacent the mouth of the bag and joining the plies together, said line of adhesive being spaced inwardly of the mouth of the bag and below the innermost reach of said notch, a plurality of spaced spots of adhesive between the plies interposed between said line of adhesive and the edge of the bag, and a plurality of other spots of adhesive between the plies positioned along the opposite side of said line of adhesive.

7. A bag for use in the packaging of coffee and other materials comprising, a tubular member longitudinally folded so as to provide gussets, said member being composed of an outer ply of absorbent paper and an inner ply of non-absorbent material, the edge of the bag mouth being inwardly notched below the end of the bag at at least one point, a line of adhesive placed between the plies adjacent the mouth of the bag and joining the plies together, said line of adhesive being spaced inwardly of the mouth of the bag and below the innermost reach of said notch, a plurality of spaced spots of adhesive between the plies interposed between said line of adhesive and the edge of the bag, said spots being spaced from the folds of the gussets, and a plurality of other spots of adhesive between the plies positioned along the opposite side of said line of adhesive.

CHARLES W. FRY.
HERBERT L. RUFF.